United States Patent [19]

Mischo et al.

[11] 4,167,678

[45] Sep. 11, 1979

[54] METHOD AND APPARATUS FOR ASCERTAINING THE POSITIONS OF FILM FRAMES

[75] Inventors: Klaus Mischo; Rudolf Paulus, both of Munich, Fed. Rep. of Germany

[73] Assignee: AGFA-Gevaert, A.G., Leverkusen, Fed. Rep. of Germany

[21] Appl. No.: 877,827

[22] Filed: Feb. 8, 1978

[30] Foreign Application Priority Data

Feb. 8, 1977 [DE] Fed. Rep. of Germany ....... 2705097

[51] Int. Cl.² .......................................... G01N 21/30
[52] U.S. Cl. .................................. 250/559; 250/560; 250/561; 250/571
[58] Field of Search ............... 250/559, 571, 560, 561, 250/548; 356/443, 444

[56] References Cited

U.S. PATENT DOCUMENTS 3,981,579  9/1976  Weinert et al. .................. 356/444 X

FOREIGN PATENT DOCUMENTS 1285317  8/1969  Fed. Rep. of Germany .
1797439  10/1976  Fed. Rep. of Germany .

Primary Examiner—David C. Nelms
Assistant Examiner—Darwin R. Hostetter
Attorney, Agent, or Firm—Peter K. Kontler

[57] ABSTRACT

Film frames of each of a series of spliced-together exposed and developed photographic films are monitored by photoelectric detector means to ascertain the positions of their leading and trailing edges prior to identification of the frames by a punching device ahead of the copying station. Those film frames whose leading and/or trailing edges cannot be detected with a requisite degree of accuracy (e.g., due to overexposure or underexposure) are pinpointed by ascertaining their length on the basis of accurately ascertained length of other film frame or frames in the same film (a) by calculating the position of the trailing edge upon accurate determination of the leading edge (or vice versa), (b) by calculating the positions of both edges on the basis of the distance between two accurately pinpointed frames which flank the frame whose edges are not detectable, (c) by measuring back from a previously pinpointed frame, or (d) by measuring forwardly from a subsequently ascertained frame.

15 Claims, 2 Drawing Figures

METHOD AND APPARATUS FOR ASCERTAINING THE POSITIONS OF FILM FRAMES

BACKGROUND OF THE INVENTION

The present invention relates to a method and apparatus for ascertaining the positions of selected portions of elongated webs of flexible material, especially to a method and apparatus for ascertaining the positions of successive frames of one or more exposed and developed photographic films preparatory to introduction of such films into a copying machine. Still more particularly, the invention relates to improvements in a method and apparatus for automatic detection of positions of film frames for the purpose of identifying such frames by suitable indicia (e.g., notches) prior to introduction into a copying machine or the like.

German Pat. No. 1,285,317 discloses a method and apparatus for determining the positions of film frames in successive exposed and developed photographic films. The patent proposes to form a so-called holding function which is obtained by continuous scanning of light transmissivity of the film. The maximum transmissivity is assumed to be in the region of a frame line (it being assumed that each monitoring step includes the evaluation of transmissivity within a film portion whose length equals or approximates the length of a film frame). An edge portion of the frame line (such edge portion also constitutes the edge portion of the adjacent film frame) can be assumed to constitute an abrupt transition between areas of higher and lower light transmissivity. As a rule, one expects that the change of transmissivity at the opposite sides of an edge of the frame line will amount to at least three to five percent which should be sufficient to reliably detect such edge by resorting to photosensitive means. Thus, one expects that, when a film frame advances beyond the monitoring device, the latter detects a reduction or increase of transparency which is in the order of at least three to five percent, and such change of transparency is indicative of detection of a film frame.

The just outline procedure allows for reliable detection of film frames whenever the transition from a frame line to the adjacent film frame or vice versa is sufficiently pronounced, i.e., when the transmissivity of the frame line is appreciably different from the transmissivity of adjacent portion of the film frame. Problems arise when such procedure is resorted to for the detection of overexposed film frames because the frame lines which flank an overexposed frame are often exposed to light so that the transmissivity gradient is low or non-existent. The same applies for underexposed frames, especially film frames which were exposed to artificial light; in such films, the difference between the light transmissivity of front or rear portions of film frames and the light transmissivity of frame lines is practically nil.

German Pat. No. 1,797,439 discloses an apparatus with two scanning slots. The distance between the two slots, as considered in the direction of film transport, equals or approximates the length of a film frame. The light beams which pass through the two slots are transmitted to discrete photosensitive devices which operate independently of each other. Thus, if one of the photosensitive devices detects a sharply defined edge between a film frame and the neighboring frame line, such edge will be used as a reference point for determination of the other edge regardless of whether or not the other edge has been detected with the same degree of definiteness and regardless of whether the sharply defined edge is the leading or trailing edge of the respective film frame.

The just described proposal also failed to gain widespread acceptance in the industry because the size of film frames and/or the width of frame lines often varies from film to film, especially if the examination of a film which was exposed in a first camera is followed by examination of a film which was exposed in another camera. This will be readily appreciated by bearing in mind that the film windows of cameras (even of cameras produced by the same manufacturer) are not identical. In many instances, the neighboring frames of a film overlap each other. Furthermore, it happens quite frequently that the boundaries between neighboring frames include so-called film veils which also contribute to inaccuracies in connection with ascertainment of the positions of successive film frames. operate independently of each other. Thus, if one of the photosensitive devices detects a sharply defined edge between a film frame and the neighboring frame line, such edge will be used as a reference point for determination of the other edge regardless of whether or not the other edge has been detected with the same degree of definiteness and regardless of whether the sharply defined edge is the leading or trailing edge of the respective film frame.

The just described proposal also failed to gain widespread acceptance in the industry because the size of film frames and/or the width of frame lines often varies from film to film, especially if the examination of a film which was exposed in a first camera is followed by examination of a film which was exposed in another camera. This will be readily appreciated by bearing in mind that the film windows of cameras (even of cameras produced by the same manufacturer) are not identical. In many instances, the neighboring frames of a film overlap each other. Furthermore, it happens quite frequently that the boundaries between neighboring frames include so-called film veils which also contribute to inaccuracies in connection with ascertainment of the positions of successive film frames.

OBJECTS AND SUMMARY OF THE INVENTION

An object of the invention is to provide a novel and improved method of automatically ascertaining the positions of film frames in each of a series of successive exposed and developed photographic films irrespective of the lack of detectability (or accurate detectability) of certain frames of a given film.

Another object of the invention is to provide a method of the just outlined character which can be resorted to for automatic pinpointing of film frames which are located in front of a detectable film frame, behind a detectable film frame or between two spaced-apart detectable film frames.

A further object of the invention is to provide a method which can be resorted to fore ascertaining the positions of film frames of successive films wherein the spacing between the frames of one film is different from the spacing of frames in the preceding or next-following film, and wherein the length of frames in one film is different from the length of frames in the preceding or next-following film.

An additional object of the invention is to provide an apparatus for the practice of the above outlined method and to provide the apparatus with novel and improved means for evaluating all such information which can contribute to accurate and fully automatic ascertainment of the positions of film frames in each of a series of films wherein the spacing and/or length of the frames may need not be identical.

Another object of the invention is to provide an apparatus which can accurately ascertain the positions of film frames prior to identification of such frames preparatory to introduction of films into a copying machine.

A further object of the invention is to provide an apparatus which can automatically ascertain the positions of frames in each of a series of spliced-together photographic films or the like even if some frames in one or more films are overexposed or underexposed so that the locations of frame lines between neighboring frames cannot be detected by photoelectric monitoring means.

One feature of the invention resides in the provision of a method of automatically ascertaining the location of frames in each of a series of photographic films wherein a transverse frame line extends between the leading edge of one and the trailing edge of the other of two neighboring frames. The method comprises the steps of transporting the films of the series lengthwise along a predetermined path, photoelectrically monitoring—in a predetermined portion of the path—the light transmissivity of successive narrow transversely extending increments of each film (the width of each increment, as considered in the longitudinal direction of the respective film, is preferably a small fraction of one millimeter, e.g., 0.2 mm) and generating signals whose characteristics (e.g., intensity) denote the transmissivity of the respective increments whereby such characteristics normally change appreciably (e.g., by at least 3 percent and often up to and in excess of 20 percent) during transport of leading and trailing edges of film frames past the aforementioned portion of the path so that the changes in characteristics of such signals denote the leading and trailing edges of successive frames of the respective film, measuring—for each film of the series—the length of at least one frame whose leading and trailing edges have initiated accurately detectable changes in the characteristics of signals, and utilizing the measured length as a criterion or yardstick (a) for determination of the location of those film frames and of those edges of film frames forming part of the respective film which failed to initiate appreciable changes (namely, photoelectrically detectable changes) in the characteristics of signals and/or (b) for determination whether or not two successively detected edges form part of one and the same film frame.

The measuring step may include measuring—during transport of each film past the aforementioned portion of the path—the length of all film frames whose leading and trailing edges have initiated detectable changes in the characteristics of signals, and the utilizing step then comprises employing as the criterion the length of that film frame whose edges initiated the generation of most pronounced changes in the characteristics of signals. The utilizing step may further comprise comparing the criterion with the measured length of each frame (of a given film) whose leading and trailing edges have initiated detectable changes in the characteristics of the signals and disregarding that one of the leading and trailing edges of a frame which has produced a less detectable change when the comparing step reveals excessive discrepancy between the measured length and the criterion. In other words, the reliability of the criterion can be improved as the monitoring of a given film progresses.

The measuring step may comprise measuring—during the transport of each film past the aforementioned portion of the path—the length of all frames whose leading and trailing edges have initiated photoelectrically detectable changes in the characteristics of signals, storing the information pertaining to the measured length, replacing the stored information with fresh information whenever the fresh information denotes a frame length which is ascertained on the basis of more pronounced changes in the characteristics of signals denoting the leading and trailing edges of the respective frame, and utilizing the fresh information as the criterion for determination of the length of film frames whose leading and/or trailing edges failed to initiate the generation of accurately detectable signals. Alternatively, the most frequently occurring length will be used as a criterion for determining the length of film frames whose leading and/or trailing edges are not readily detectable (or are not detectable at all).

The measuring and utilizing steps can take place while the respective frames of the film whose increments are monitored in the aforementioned portion of the path are located in an elongated second portion of the path (downstream of the predetermined portion). The length of the second portion of the path is preferably a multiple (e.g., at least four times) the length of a single film frame of the respective film. The measuring step then comprises (or may comprise) storing information pertaining to the positions and quality of the edges of frames in the second portion of the path and to the measured length of frames with edges which initiated accuragely detectable changes in the characteristics of signals, and the utilizing step then comprises (or may comprise) utilizing the measured lenth of the frame with highest-quality leading and trailing edges as a criterion for determination of an edge which failed to initiate appreciable changes in the characteristics of signals upon determination that the respective frame has a reproducible image. The utilizing step may further comprise retroactively pinpointing the position of a film frame whose edges are not detectable in the course of the montioring step and which is located between two successive frames with photoelectrically detectable edges (such successive frames are spaced apart by a distance which is at least equal to one of the measured lengths). The pinpointing step then comprises comparing the distance between the just mentioned successive frames with a predetermined raster or pattern denoting a whole multiple of an average distance between two frames which are separated by a single intermediate frame. The aforementioned distance equals the length of n film plus the width of n+1 frame lines wherein n is a whole number including one.

Alternatively, the utilizing step may further comprise retroactively pinpointing the position of a film frame whose edges are not detected in the course of the monitoring step and which is located behind a film frame with photoelectrically detectable edges. The pinpointing step comprises resorting to a predetermined raster which denotes a whole multiple of an average distance between two frames which are separated by a single intermediate frame.

As another alternative, the utilizing step may comprise pinpointing the position of a given frame whose edges are not detected in the course of the monitoring step and which is located ahead of a frame with photoelectrically detectable edges. The pinpointing step then includes plotting the position of the given frame in dependency on the normal or average spacing between the frames of the respective film.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
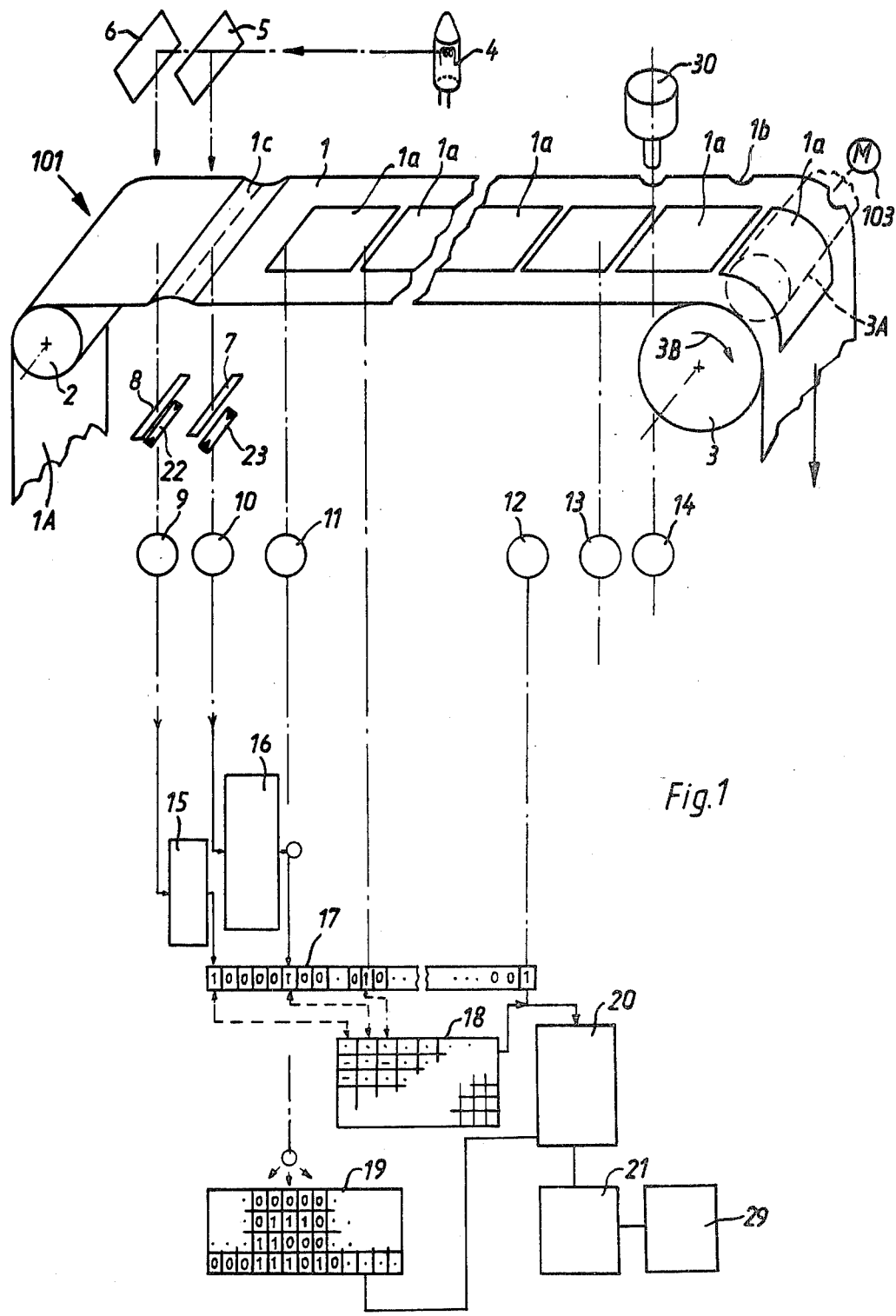
FIG. 1 is a fragmentary partly perspective and partly diagrammatic view of an apparatus which embodies the invention.

FIG. 1 shows a portion of a photographic film 1 having a row of film frames 1a. The film 1 is assumed to be exposed and developed and is thus ready for introduction into a copying machine for the making of reproductions of some or all of the frames 1a. Furthermore, the film 1 is assumed to be provided with customary perforations (which have been omitted for the sake of clarity) to facilitate transport in the photographic apparatus as well as toward, through and beyond the copying station. That marginal portion of the film 1 which is remote from the observer of FIG. 1 is provided with spaced-apart indicia in the form of notches 1b, one for each film frame 1a. Such notches are applied by (and are thus located to the right of) a punching device 30 which is adjacent the path of movement of the respective marginal portion and is actuated at requisite intervals. Each notch 1b denotes or identifies the associated film frame 1a for proper positioning at the copying station.

The reference character 1c designates a splice between the trailing end of the film 1 and the leader of the next-following film 1A. These films form part of an elongated series of films or web 101 which may be several hundred meters long to insure that the copying machine can make reproductions of a large number of film frames without interruption which arise when a discrete fresh web is to replace the preceding web. As a rule, the splice 1c will be formed by trimming the neighboring end portions of the films 1, 1A and by coupling such end portions to each other by one or more adhesive-coated uniting bands. The uniting band or bands preferably consist of a material which absorbs infrared light so that successive splices 1c in the web 101 including the films 1 and 1A can be readily located by a suitable infrared detector having a sender and a receiver.

The web 101 including the films 1 and 1A is trained over an idler roll 2 and a driven roll 3. The means for transmitting torque to the roll 3 so that the latter rotates in the direction indicated by arrow 3B preferably includes a suitable stepping motor 103 of any known design. A further roll 3A (a portion of which is indicated by broken lines) is provided to bias successive increments of the web 101 against the periphery of the driven roll 3. This reduces the likelihood of slippage of films relative to the roll 3. The length of each discrete step of the web is 0.2 millimeter, i.e., it is necessary to start the stepping motor 103 five times in order to transport the web 101 through a distance of one millimeter.

A light source 4 is mounted at a level above the path of the web 101 (as viewed in FIG. 1) to direct a beam of light against a partially light-transmitting mirror 5. It is assumed that the mirror 5 reflects the visible range of the spectrum, especially blue light, against the adjacent portion of the web 101. The bundle of light which penetrates through the film 1 thereupon passes through an elongated scanning slot 7 which is defined by a suitable mask and extends transversely of the direction of lengthwise movement of the films 1 and 1A. The arrangement is such that the scanning slot 7 receives the major part of light which is reflected by the mirror 5 and penetrates through the web 101, and such light impinges upon the receiver of a photosensitive detector or monitoring means 23. The width of the slot 7 is 0.2 millimeter, i.e., the same as the length of a step which is performed by the web 101 in response to starting of the motor 103 for the roll 3.

The mirror 5 transmits a certain amount of light, especially infrared light, and such light is reflected by a second mirror 6 which directs reflected light against the web 101. Infrared light which penetrates through the adjacent film thereupon passes through a second scanning slot 8 and impinges upon the receiver of an infrared radiation detector 22. As mentioned above, each splice 1c absorbs the major part of infrared light so that the detector 22 can readily detect the presence of splices.

The distance between the scanning slots 7 and 8 equals or approximates one-half the length of a film frame 1a, as considered in the longitudinal direction of the web 101. Such distance can be changed, depending on the design and/or adjustment of an evaluating circuit 20 which will be described below.

The output of the receiver of the detector 22 for infrared light is connected with a time delay device 15 which is a counter and serves to delay the transmission of signals received from 22 for an interval of time corresponding to that which is required to transport the splice from a position (9) of alinement with the slot 8 to a position (10) of register with the slot 7. The output of the counter 15 transmits signals to a signal storing device 17. Each signal which is transmitted by the output of the counter 15 is indicative of a discrete splice 1c.

The receiver of the detector 23 behind the scanning slot 7 is connected with a signal comparing circuit 16 which is designed to develop a so-called holding function in order to ascertain the maximum transparency values of the film (1 in FIG. 1) in the region between the loci 10 and 11, i.e., in the region which is disposed between the slots 7 and 8 (mirrors 5 and 6). A somewhat similar signal comparing circuit is disclosed, for example, in German Pat. No. 1,285,317. The arrangement is such that the intensity or another characteristic of each fresh signal which is transmitted by the receiver 23 is compared with the same characteristic of the preceding signal. The signal whose intensity is higher is stored and the signal of lower intensity is erased. The output of the receiver of the detector 23 transmits a signal during each transport of the web 101, i.e., in response to each starting of the motor 103 for the driven roll 3. The just described mode of operation of the signal comparing circuit 16 insures that the signal which remains stored therein is invariably indicative of the maximum transparency of the respective portion of the web 101. The output of the signal comparing circuit 16 is connected to the device 17.

The signal storing device 17 is (or operates in a manner similar to that of) a shift register. A signal which is transmitted (by the counter 15) to the first stage of the signal storing device 17 is transported into the next stage and so forth in response to each starting of the stepping motor 103. The device 17 can be said to constitute a means for storing signals denoting certain deviations from average or expected characteristics of the transmissivity curve, i.e., the stored signals can denote the trailing end of a film, the leader of a film, a splice 1c and the maximum transparency of a monitored portion of the web 101. If the device 17 does not receive a signal from the counter 15, the respective stage stores a zero signal (0).

The signal storing device 17 is connected with a data storage device 18 wherein each row corresponds to an "event" in the storing device 17 and is assigned a predetermined position. The data in the device 18 are shifted upon processing of an "event" in the storing device 17 by the evaluating circuit 20 so that such data are transferred to the next row. This insures a continuity of information.

The apparatus further comprises a memory circuit 19 which contains a plurality of signal storing cells, each corresponding to one advancement of the web through a predetermined distance. The advancements correspond to the so-called true or genuine length of an image, namely to the distance between the front and rear edges of a film frame 1a as viewed in the direction of forward movement of the web 101. Otherwise stated, such advancement corresponds to the length of a film frame 1a. As already mentioned above, the length is constant or practically constant for each frame of a given film and, therefore, the determination of true length is a valuable aid in ascertaining the positions of those leading and trailing edges of film frames which cannot be adequately or reliably ascertained by photoelectric means. Such lengths are ascertained by determining the number of steps which the web 101 must perform in order to advance through a distance corresponding to that between two (leading and trailing) edges of a film frame 1a forming part of a particular film (in FIG. 1, the particular film is the film 1). The measurement is started anew for each and every film of the web 101 in order to avoid inaccuracies which are attributable to the fact that the length of frames and/or the width of frame lines in a preceding film need not be identical with the length of frames and/or the width of frame lines in the next-following film. In other words, signals which are stored in the memory circuit 19 are erased in response to detection of successive splices 1c. The erasure of signals in the circuit 19 takes place when a splice 1c reaches the location 11.

The construction of the memory circuit 19 is such that it can be addressed at any time to furnish information denoting the most frequently occurring signals which are stored therein. This enables the memory circuit 19 (normally upon completion of evaluation of the length of the first or foremost film frame 1a forming part of a given film) to furnish pertinent information for determination of the length of each next-following or preceding frame of the same film. Thus, the apparatus can determine the length of a film frame even if the photoelectric monitoring means are incapable of furnishing adequate signals for obtaining such information with a requisite degree of accuracy.

The evaluating circuit 20 is connected with the output of the memory circuit 19 and temporarily stores information pertaining to the most frequently ascertained length of film frames 1a in a given film during the interval when the monitoring of a film is completed at the scanning slot 7 and until the next-following splice 1c reaches the punching device 30. The exact nature of that unit (26 in FIG. 2) of evaluating circuit 20 which serves for temporary storage of signals received from the memory circuit 19 and denoting the most frequently ascertained length of film frames within a film forms no part of the present invention. Such devices are well known in the art.

When a film of the web 101 advances beyond the locus 11, all such information which can be detected by photoelectric means is stored in the device 17, device 18 and/or memory circuit 19. The just mentioned information embraces information which can be utilized to properly locate the frames 1a of the film whose trailing end has advanced beyond the locus 11.

The distance between the locus 11 and the next-following locus 12 adjacent to the path of the web 101 preferably equals the combined length of at least four successive film frames 1a. This portion of the path for the web 101 constitutes a magazine or reservoir, and all relevant information pertaining to those frames which are located in the magazine between the loci 11 and 12 is already stored in the device 17 and 18. Such information undergoes logical evaluation in the circuit 20 and is thereupon stored in a further storage device 21. The latter furnishes information regarding the number of steps which the film must cover in order to place the next-following frame 1a into requisite position with respect to the punching device 30. The device 30 is positioned at the locus 13 and the leading edge of the frame 1a which is adjacent the punching device 30 is located at 14 when such frame is ready to be identified by a notch 1b. The number of steps which the web 101 must perform in order to advance an increment of a film from the position 13 to the position 14 depends on several factors, for example, on the length of steps which are performed by the web in response to starting of the motor 103 and on the length of film frames. The reference character 29 denotes the control circuit for the motor 103 and punching device 30. This control circuit receives signals from the storage device 21.

Figure 2:
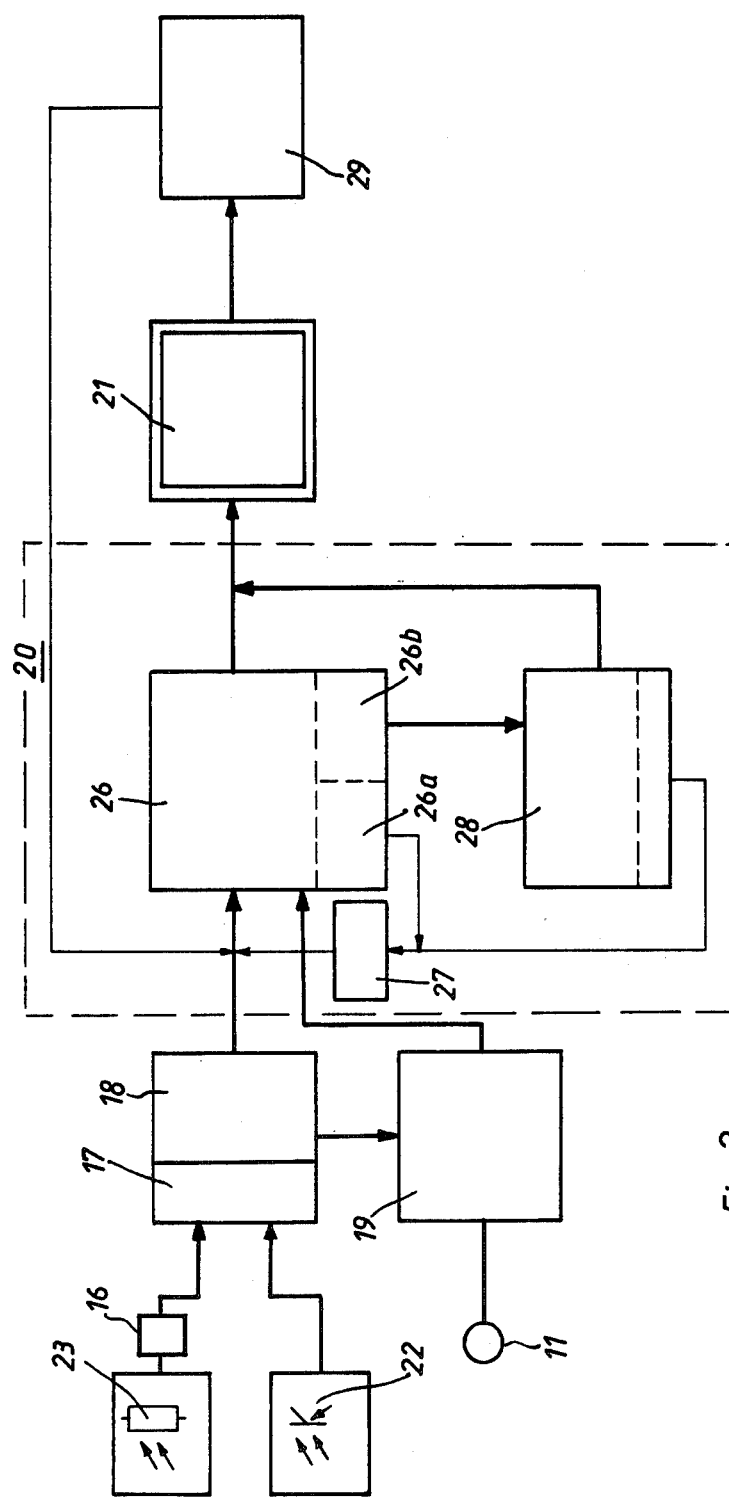
FIG. 2 is a block diagram of certain components of the apparatus which is shown in FIG. 1.

The construction of the evaluating circuit 20 is shown in FIG. 2. The determination of the position of frames 1a involves two parallel operations which are regulated independently of each other. One operation involves the determination and storage of information pertaining to several factors or values such as the leading and trailing edges of frames, splices, rising or decreasing light transmissivity in the regions of frame lines, detection of frames without any images, etc. The second operation involves actual determination of the position of the film frame; this includes an examination of the aforementioned values, a decision whether or not the detected edges of film frames are acceptable for determination of the position of film frames and, if necessary, an entirely new calculation of the position of film frames. Both branches in the evaluating circuit 20 can be overruled by the control circuit 29 which controls the operation of the motor 103 and the punching device 30.

The signals which are transmitted by the receivers of the detectors 22 and 23 are transmitted (via 16) to the device 17 and thence to the device 18. The devices 17 and 18 evaluate the quality of signals which denote the leading and trailing edges of film frames and other logical criteria in order to ascertain whether or not such quality is satisfactory for unequivocal pinpointing of film frames with respect to the punching device 30. The device 17 stores and transports signals "1" when it receives information designating the leading edge of a frame 1a, the trailing edge of a frame and a splice 1c. The information stored in the device 18 includes data more accurately identifying the nature of various events, i.e., whether a signal "1" denotes the leading or the trailing edge, the relationships of transmissivities of leading and trailing edges and the intensity of signals denoting the detection of edges.

The memory circuit 19 stores information pertaining to the most frequently ascertained length of film frames 1a, and its output is connected with the evaluating circuit 20. When addressed, the memory circuit 19 transmits signals to the evaluating circuit 20, and each preceding signal is superseded by a different signal if the scanning of a film by detector 23 reveals that the distance between the leading and trailing edges of a frame 1a moving past the detector 23 can be ascertained with a greater degree of accuracy than the length of preceding frames of the same film. Thus, the signal comparing action of the circuit 19 is analogous to that of the circuit 16.

The circuit 20 evaluates the information which is furnished by the devices 17, 18 and memory circuit 19, and such evaluation takes place at the locus 12. The locus 12 is overlapped by a film 1a which is located at or is close to the notching station (punching device 30). The circuit 20 screens the information which is needed for proper positioning of a film frame 1a about to reach the punching device 30 while the latter provides the adjacent film (1 in FIG. 1) with a notch 1b. Under normal circumstances, the circuit 20 evaluates information pertaining to the leading and trailing edges of a frame 1a which is about to advance to the notching station. Thus, if the leading and trailing edges were detected with a requisite degree of accuracy, the circuit 20 compares the distance between such edges with a signal which is furnished by the memory circuit 19. The intensities or other characteristics of the two signals match so that the unit 26 of the circuit 20 receives an appropriate signal for transmission to the control circuit 29 via device 21.

If one of the edges cannot be detected with the required degree of accuracy, or cannot be detected at all, the circuit 20 ascertains the position of the unsatisfactory edge on the basis of information furnished by the memory circuit 19 (by counting forwardly from the satisfactory trailing edge or backwards from the satisfactory leading edge). A prerequisite for such mode of operation is that one edge of the respective frame 1a has been detected with the required degree of accuracy, i.e., that the detection of such edge resulted in a sufficiently pronounced change of intensity of the signal furnished by the detector 23. Additional criteria (such as the differences in light transmissivity of leading and trailing edges—these differences should not exceed a certain value) can also be considered in determination of the position of one edge when only the other edge is ascertainable with the requisite degree of accuracy.

If neither of the edges can be ascertained with a requisite degree of accuracy, the unit 26 of the evaluating circuit 20 transmits a signal to a unit 26a which energizes an erasing circuit 27 so that the signal transmitted by the output of the device 18 is cancelled and the corresponding frame 1a advances beyond the punching device 30 while the latter remains idle, i.e., the frame is not identified by a notch 1b and its image is not reproduced in the copying machine.

Alternatively, and especially if the circuit 20 is not in a position to immediately ascertain the leading and trailing edges of a film frame, the positions of the edges are ascertained in response to a signal from the unit 26b. Such signal triggers a determination of the length of the frame 1a on the basis of information which is stored in the memory circuit 19. The determination can be carried out in one of the following ways:

(a) Assume that the frame 1a whose edges are not readily detectable is located between two frames whose length has been ascertained with the required degree of accuracy. The length of the frame 1a is then determined by interpolation, i.e., by comparing the distance between the accurately pinpointed frames with the length of one of these frames. Such distance may be n times the length of a properly detected frame plus n+1 times the width of a frame line wherein n is a whole number including one. The distance is compared (in unit 28) with a raster which is obtained by counting the number of stepwise advances expected to be necessary to advance the film by the length of a frame.

(b) If only one film frame has been pinpointed with a requisite degree of accuracy (and such frame is located at the notching station) while the magazine between 11 and 12 does not contain any frames whose length has been ascertained with that degree of accuracy which is needed to allow for use of the length of such frames as a criterion for determination of the length of other film frames, the circuit 20 counts backwards, i.e., in a direction from the notching station toward the detector 23 by alloting a certain number (e.g., 190) of stepwise advances of the film 1 toward the punching device 30 before the latter receives a signal to form the next notch. This is tantamount to rolling of a raster or pattern in a direction from the notching toward the monitoring station.

(c) If an accurately pinpointed frame 1a is close to the scanning station, the procedure is the opposite of that outlined at (b) above, i.e., the raster or pattern is rolled forward to allow for determination of the length of a frame between the pinpointed frame at the monitoring station and the notching station.

The evaluating circuit 20 is a digital computer. The exact details of all its constituents form no part of the invention.

The improved method and apparatus can be modified in a number of ways without departing from the spirit of the invention. For example, the circuit 16 can be replaced with a circuit which compares the light transmissivity of successive increments of a film with a standard or reference value, e.g., with the transparency of a film in unexposed regions close to its ends where the transparency is normally constant. As a rule, the light transmissivity of that portion of a film which is located immediately behind the leader extending from a cassette is constant and can be used as a reference value.

Though the improved method and apparatus are especially suited in connection with the processing of so-called 135 films wherein the frames are not identified in advance by perforations, the invention can be practiced with equal advantage for the processing of all other types of films wherein the frames are not identified in advance but must be pinpointed prior to introduction into a copying machine or the like.

The films can remain stationary if the scanning stations are moved lengthwise of the web.

The method and apparatus of the present invention are based on the recognition that, even though the length of film frames and/or the width of frame lines in successive films (which might have been exposed in different types and/or makes of cameras) often varies within a rather wide range, the length of frames and/or the width of frame lines in one and the same film is always or practically invariably constant (it being assumed that all frames of a film were exposed in one and the same camera). Therefore, and if at least one frame of a film can be pinpointed with a reasonable degree of accuracy (namely, the locations of the leading and trailing edges of at least one film frame can be accurately detected by photoelectric means), the thus ascertained length can be used as a yardstick or criterion for determination of the length of other film frames whose leading and/or trailing edges failed to initiate readily and accurately ascertainable changes in the characteristics of signals furnished by the detector 23. The criterion can be used as a yardstick for comparison with the length of all other film frames, as a yardstick for determination of the position of film frames which are located between two spaced-apart film frames with accurately defined leading and trailing edges, of the position of a frame located in front of a frame with accurately defined leading and trailing edges, or of the position of a frame located behind a film frame with accurately defined leading and trailing edges.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. A method of automatically ascertaining the locations of frames in each of a series of photographic films wherein a transverse frame line extends between the leading edge of one and the trailing edge of the other of two neighboring frames, comprising the steps of transporting the films of the series lengthwise along a predetermined path; photoelectrically monitoring, in a predetermined portion of said path, the light transmissivity of successive narrow transversely extending increments of each film and generating signals whose characteristics denote the transmissivity of the respective increments whereby such characteristics normally change appreciably during transport of leading and trailing edges of said frames past said portion of said path; measuring, for each film of said series, the length of at least one frame whose leading and trailing edges have initiated accurately detectable changes in the characteristics of said signals; and utilizing the measured length as a criterion for determination of the location of those film frames and those edges of film frames forming part of the respective film which failed to initiate appreciable changes in the characteristics of said signals and/or for determination whether two successively detected edges from part of one and the same film frame.

2. A method as defined in claim 1, wherein said measuring step includes measuring, during transport of each film past said portion of said path, the length of all film frames whose leading and trailing edges have initiated detectable changes in the characteristics of said signals, said utilizing step comprising employing as said criterion the length of that film frame whose edges initiated the most pronounced changes in the characteristics of said signals.

3. A method as defined in claim 2, wherein said utilizing step further comprises comparing said criterion with the measured length of each frame whose leading and trailing edges have initiated detectable changes in the characteristics of said signals and disregarding that one of the leading and trailing edges of a film frame which has initiated a lesser change in the characteristics of said signals when said comparing step indicates excessive discrepancy between the measured length and said criterion.

4. A method as defined in claim 1, wherein said measuring step comprises measuring, during transport of each film past said predetermined portion and said path, the length of all frames whose leading and trailing edges initiated photoelectrically detectable changes in the characteristics of said signals, storing the information pertaining to the measured length, replacing the stored information with fresh information whenever such fresh information denotes a frame length which is ascertained on the basis of more pronounced changes of characteristics of signals denoting the leading and trailing edges of the respective frame, and utilizing the fresh information as said criterion.

5. A method as defined in claim 1, wherein said measuring and utilizing steps take place while several frames of a film whose increments are monitored in said first portion of said path are located in an elongated second portion of said path, the length of said second portion being a multiple of the length of a single film frame.

6. A method as defined in claim 5, wherein said measuring step include storing information pertaining to the positions and quality of edges of frames in said second portion of said path and to the measured length of frames with edges which initiated accurately detectable changes in the characteristics of said signals, said utilizing step comprising applying the measured length of the frame with highest-quality leading and trailing edges as a criterion for determination of the position of an edge which failed to initiate appreciable changes in the characteristics of said signals, said applying step taking place upon determination that the respective frame has a reproducible image.

7. A method as defined in claim 6, wherein said utilizing step further comprises retroactively pinpointing the position of a frame whose edges are not detected in the course of said monitoring step and which is located between two successive frames with photoelectrically detectable edges, said succesive frames being spaced apart by a distance which is at least equal to one of said measured lengths, said pinpointing step including comparing the distance between said successive frames with a predetermined raster denoting a whole multiple of an average distance between two frames which are separated by a single intermediate frame.

8. A method as defined in claim 7, wherein said distance equals the length of n film frames plus the width of n+1 frame lines, n being a whole number including one.

9. A method as defined in claim 6, wherein said utilizing step further comprises retroactively pinpointing the position of a film frame whose edges are not detected in the course of said monitoring step and which is located behind a frame with photoelectrically detectable edges, said pinpointing step including resorting to a raster which denote a whole multiple of an average distance between two frames which are separated from each other by a single intermediate frame.

10. A method as defined in claim 6, wherein said utilizing step further comprises pinpointing the position of a given film frame whose edges are not detected in the course of said monitoring step and which is located ahead of a frame with photoelectrically detectable edges, said pinpointing step including plotting the position of said given film frame in dependency on the normal spacing between the frames of the respective film.

11. Apparatus for automatically ascertaining the locations of frames in each of a series of photographic films wherein a transverse frame line extends between the leading edge of one and the trailing edge of the other two neighboring film frames, comprising means for transporting the films of said series along a predetermined path; means for photoelectrically monitoring the light transmissivity of successive narrow transversely extending increments of each film in a predetermined portion of said path, including means for generating signals whose characteristics denote the transmissivity of the respective increments whereby such characteristics normally undergo appreciable changes during transport of leading and trailing edges of said frames past said portion of said path; signal comparing means connected with said signal generating means and operative to transmit signals including those denoting the regions of maximum transmissivity of successive frames; means for storing the signals transmitted by said signal comparing means; memory means connected with said storing means and operative to furnish second signals denoting the most frequently ascertained length of frames in a film; and means for evaluating said stored signals and said second signals.

12. Apparatus as defined in claim 11, wherein said storing means comprises a first storing device for signals denoting all changes in the characteristics of said signals for a given film and a second storing device for data denoting the nature and quality of frame edges, said memory means being connected with said second storing device.

13. Apparatus as defined in claim 11, further comprising means for applying indicia to successive films, each of such indicia denoting a film frame, said indicia applying means being located downstream of said portion of said path, as considered in the direction of film transport, and said path including a second portion disposed between said predetermined portion and said indicia applying means, the length of said second portion being a multiple of the length of a film frame and said evaluating means being operative to evaluate signals pertaining to the film frames in said second portion of said path.

14. Apparatus as defined in claim 13, wherein said first storing device includes means for transporting signals pertaining to successive frames at a location disposed downstream of said monitoring means at a distance from said monitoring means which is less than the length of a film frame.

15. Apparatus as defined in claim 13, wherein said evaluating means comprises means for comparing said second signals with data furnished by said second storing device and for transmitting third signals for actuation of said indicia applying means.

* * * * *